April 29, 1958     D. W. BAKER 2ND     2,832,502
INSTRUMENT SEALING MEANS
Filed Sept. 28, 1954
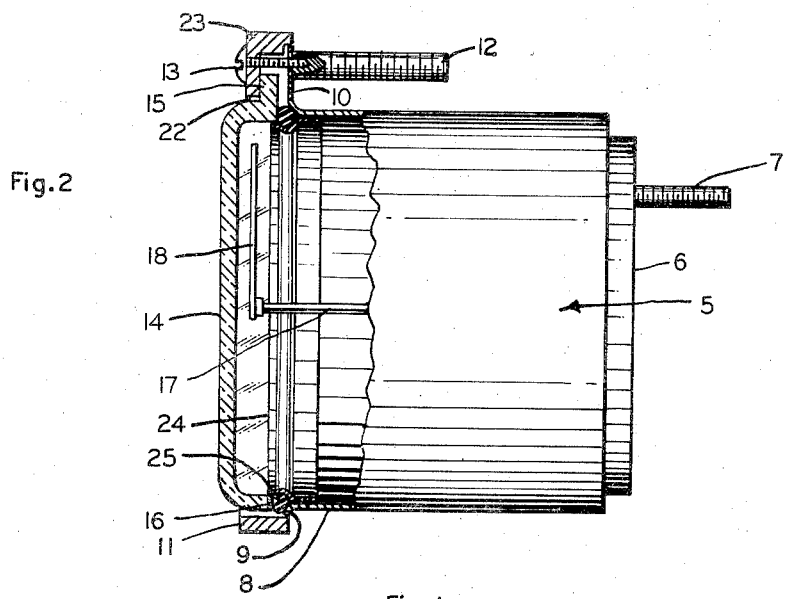
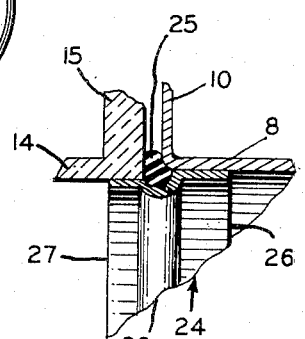
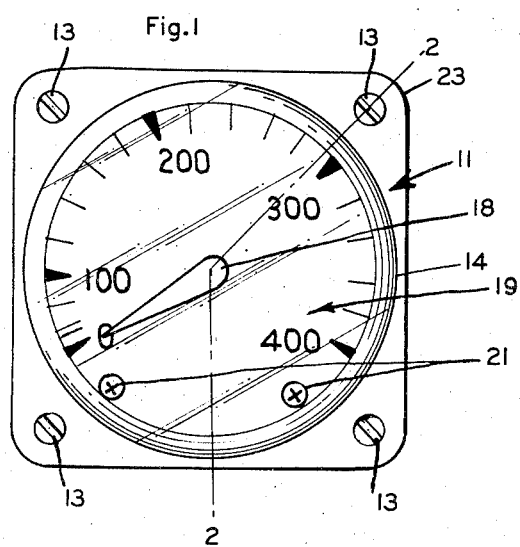
Inventor:
Daniel W. Baker 2nd
by, Richard E. Hosley
His Attorney

United States Patent Office 2,832,502
Patented Apr. 29, 1958

2,832,502

INSTRUMENT SEALING MEANS

Daniel W. Baker 2nd, South Dartmouth, Mass., assignor to General Electric Company, a corporation of New York Application September 28, 1954, Serial No. 458,852

3 Claims. (Cl. 220—46)

This invention relates to improvements in instrument sealing means and has for its object the provision of a sealing member in the form of an attachment permitting rapid conversion of a conventional instrument normally made for indoor use to one quite suitable for outdoor, all-weather applications.

In one form of indoor instrument now commercially available, the housing therefor is in the form of a closed casing having an open end into which is placed the instrument mechanism. A suitable scale and pointer are provided, and the entire mechanism, including the scale and pointer, is covered by a protective glass closure member. Suitable means are provided to clamp this glass cover in place, and a thin gasket may be used between the cover and the housing to prevent ingress of dirt, dust, and other similar objectionable matter that might conceivably interfere with the effective operation of the instrument.

If such an instrument is installed for outdoor, all-weather use, the casing and cover will normally have suitable weather resistant properties to permit such use, but the thin gasket normally utilized for keeping out dust and dirt will be wholly inadequate as an effective seal against the deleterious effects of rain, sleet, snow, and the like.

To overcome the ineffectiveness of the aforementioned thin gasket, and to add to the versatility of an indoor instrument embodying such a gasket, the present invention contemplates an improved seal in the form of a heavy-duty deformable member carried by a removable sleeve and designed to replace the gasket and convert the indoor instrument to one suitable for outdoor use without further modification thereof.

The invention will be best understood upon reference to the detailed description set forth below, when taken in conjunction with the drawing annexed hereto, in which:

Figure 1 is a front view of an instrument embodying the present invention;

Figure 2 is a side view of the instrument shown in Figure 1, partially in section, taken along the lines 2—2 in Figure 1 with the scale, dial, and associated mounting structure removed;

Figure 3 is an enlarged fragmentary sectional view of the improved sealing means; and Figure 4 shows a front and a side view of the deformable member used as a part of the improved seal.

Referring first to Figure 1 there is shown a front view of a typical long-scale electrical measuring instrument, which in this case happens to be an alternating current ammeter having an expanded scale reading up to 400 amperes, it being understood, of course, that an ammeter has been selected solely to illustrate the broad principle of the invention and not in any way to indicate its limits or scope. The instrument shown is normally intended for indoor mounting on suitable electric panels or switchboards, but it has been converted to one suitable for outdoor, all-weather use by the improved sealing means set forth in detail hereinafter.

As shown in Figure 2, the instrument comprises a housing in the form of a cylindrical metallic casing 5 having an open end into which may be inserted the instrument mechanism. The terminals for connection of the instrument mechanism to the external circuits being measured may extend from the closed end 6 of the casing, one terminal being shown comprising the threaded terminal part 7.

The wall 8 of the casing is formed at its open end to provide a peripheral portion surrounding the opening in the form of a flange 9, the outline of which may be substantially square to conform with the substantially square-shaped clamping plate 11. The effect of the design is to provide mounting ears 10 at each corner of the instrument from which may extend rearwardly therefrom suitable mounting parts in the form of threaded studs, one of which is shown at 12. The stud 12 may be rigidly affixed to the flange ear by any suitable technique, as by brazing, welding, or the like, and its inner end may be bored out and tapped to receive the end of a clamping screw 13.

The front cover for the instrument is in the form of a somewhat dish-shaped glass plate 14 provided with four mounting ears, one being shown at 15, to cooperate with the mounting ears of the casing. The glass cover 14 has a peripheral portion adjacent the flange 9 by virtue of the inturned annular edge 16.

An instrument mechanism is suitably mounted within the casing 5, the details of which are not shown as they form no part of the subject invention. However, such mechanism may include a pointer shaft 17 and associated pointer 18 for cooperation with a scale dial 19. The scale may be secured in place by a pair of suitable screws 21 cooperating with associated mounting structure supported within casing 5. Both the scale 19 and its mounting structure have been deliberately omitted from Figure 2 for the sake of clarity, as they too form no part of the subject invention.

Considering once again the clamping plate 11, it may be of some suitable molded plastic and has a centrally disposed opening 22 so that it may be slipped over the glass cover such that its internally recessed ears 23 overlie the cover ears 15 and the flange ears 10. Ears 23 have suitable apertures therein for receiving screws 13 so that the entire cover structure can be securely affixed to the casing.

Everything so far described is of conventional design, and in the event that the instrument is to be used for indoor applications, a thin gasket could be cut out to conform with the configuration of flange 9 and placed on the flange underneath the peripheral edge 16 of the glass cover. With the plate 11 in place, the screws 13 would be tightened up and the gasket would be gripped between the cover and the casing to provide normal indoor sealing.

To convert the instrument heretofore described to one suitable for outdoor use, the cover, cover plate, and gasket would be removed and the gasket replaced by the novel sealing means forming the subject invention. This means comprises a sealing member in the form of an annular sleeve 24 carrying thereon a deformable sealing portion in the form of an annular deformable O-ring 25. The O-ring 25 is of a type well known in the art and is adapted to be readily deformed under pressure to provide the necessary sealing action.

The sleeve 24 has its inner end 26 slidably engaging the inner surface of the casing wall 8 and has its outer end 27 adapted for slidable engagement with the cover. Between the inner and outer ends is a grooved portion 28 carrying therein the O-ring 25. The O-ring 25 and sleeve 24 comprise an integral assembly, one that is easy and economical to manufacture, and one that is readily inserted within the casing to provide an effective outdoor seal. The parts may be dimensioned so that the casing automatically centers and aligns the inner end of the sleeve and the O-ring has a large enough diameter to permit it to overlie the flange 9 and thus prevent the sealing parts from ever slipping into the casing. By the same token, the glass cover slidably engages the outer end of the sleeve to be aligned by it, thereby facilitating quick and positive assembly of the parts. Once in place, the clamping action provided by screws 13 will cause the O-ring to deform and provide an effective seal at the junction of cover and casing. The O-ring and sleeve can be made as a unit and will readily convert the instrument to one suitable for outdoor use, without any changes or modifications in design of the instrument housing, cover plate, or cover, or other parts of the instrument.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. An outdoor instrument housing comprising, in combination: a tubular container having an open end, a unitary sealing attachment comprising a tubular sleeve formed with a peripheral groove about its surface intermediate its ends and an annular deformable sealing member disposed peripherally about said sleeve in said groove, said sleeve having one of its ends inserted within said open end in sliding engagement with said container to align said sealing member therewith, said sealing member overlying and abutting said container at said open end, a cover member overlying and abutting said sealing member, said cover member being formed with a cylindrical bore, said sleeve having the other of its ends inserted within said bore in sliding engagement therewith to align said cover member thereon, and clamping means cooperating with said container and said cover member for clamping said cover member on said container, whereby said sealing member is deformed in mutually aligned sealing engagement with said cover member and said container.

2. The combination of claim 1, in which said container is formed with an outwardly flaring flange portion at its open end, said sealing member overlies and abuts said flange portion, and said clamping means cooperates with said flange portion and said cover member for deforming said sealing member in sealing engagement with said cover member and said container.

3. The combination of claim 1, in which said clamping means comprises a clamping plate formed with an opening for receiving said cover member, and said cover member is formed with outwardly extending mounting portions about at least a part of its periphery, said clamping plate overlying an abutting said mounting portions; together with fasteners for securing said clamping plate to said container.

References Cited in the file of this patent
UNITED STATES PATENTS

| | | |
|---|---|---|
| 1,170,786 | Thomas | Feb. 8, 1916 |
| 1,802,735 | Pudelko | Apr. 28, 1931 |
| 1,803,842 | Davidson | May 5, 1931 |
| 2,097,511 | Caestecker | Nov. 2, 1937 |
| 2,380,071 | Planett | July 10, 1945 |
| 2,402,253 | Macleod | June 18, 1946 |
| 2,598,220 | Burkhardt | May 27, 1952 |
| 2,735,575 | Lehman | Feb. 21, 1956 |